(12) United States Patent
Moore et al.

(10) Patent No.: US 7,496,583 B2
(45) Date of Patent: Feb. 24, 2009

(54) PROPERTY TREE FOR METADATA NAVIGATION AND ASSIGNMENT

(75) Inventors: Jason F. Moore, Redmond, WA (US); Cornelis K. Van Dok, Bellevue, WA (US); Relja Ivanovic, Redmond, WA (US); Colin R. Anthony, Kirkland, WA (US); Richard M. Banks, Egham (GB)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 10/837,487

(22) Filed: Apr. 30, 2004

(65) Prior Publication Data

US 2005/0246352 A1 Nov. 3, 2005

(51) Int. Cl.
*G06F 17/30* (2006.01)

(52) U.S. Cl. .................... 707/100; 707/102
(58) Field of Classification Search .............. 707/1, 707/2–5, 100, 102, 104.1; 715/769
See application file for complete search history.

(56) References Cited

U.S. PATENT DOCUMENTS

| | | | |
|---|---|---|---|
| 5,241,671 A | 8/1993 | Reed et al. ............... 707/104.1 |
| 5,333,315 A | 7/1994 | Saether et al. .................. 707/1 |
| 5,388,196 A | 2/1995 | Pajak et al. .................. 715/751 |
| 5,461,710 A | 10/1995 | Bloomfield et al. |
| 5,499,364 A | 3/1996 | Klein et al. .................. 709/202 |
| 5,504,852 A | 4/1996 | Thompson-Rohrlich .... 715/835 |
| 5,513,306 A | 4/1996 | Mills et al. .................. 715/530 |
| 5,559,948 A | 9/1996 | Bloomfield et al. |
| 5,598,524 A | 1/1997 | Johnston, Jr. et al. |
| 5,630,042 A | 5/1997 | McIntosh et al. ............ 715/744 |
| 5,680,563 A | 10/1997 | Edelman ..................... 715/835 |
| 5,696,486 A | 12/1997 | Poliquin et al. ............. 340/506 |
| 5,757,925 A | 5/1998 | Faybishenko ............... 709/203 |

(Continued)

FOREIGN PATENT DOCUMENTS

CN     1421800     11/2001

(Continued)

OTHER PUBLICATIONS

"Predefined Properties" http://help.sap.comlsaphelp—ep50sp5/helpdata/en/la/9a4a3b80f2ec40aa7456bc87a94259/content.htm.

(Continued)

*Primary Examiner*—Cheryl Lewis
(74) *Attorney, Agent, or Firm*—Shook, Hardy & Bacon LLP

(57) ABSTRACT

A property tree user interface permits user assignment of values to metadata properties and user navigation of data, within a system that includes a data storage subsystem in which data items are organized and queried by way of properties. The property tree includes nodes that expose properties of data items. A user may interact with the property tree in order to effect an assignment of a property, in which case the value associated with the property in the data storage subsystem is modified. User input with respect to the property tree may also be indicative of a query of data storage, in which case a browsable view of data items responsive to the query is displayed. The property tree may also display nodes that represent folders within a hierarchical file system, nodes that represent properties with inherent hierarchy, and nodes that represent user-defined hierarchical properties.

30 Claims, 19 Drawing Sheets

U.S. PATENT DOCUMENTS

| | | | |
|---|---|---|---|
| 5,790,121 A | 8/1998 | Sklar et al. | 715/853 |
| 5,802,516 A | 9/1998 | Shwarts et al. | 707/6 |
| 5,831,606 A | 11/1998 | Nakajima et al. | 715/841 |
| 5,835,094 A | 11/1998 | Ermel et al. | 715/848 |
| 5,838,317 A | 11/1998 | Bolnick et al. | 715/764 |
| 5,838,322 A | 11/1998 | Nakajima et al. | 715/846 |
| 5,867,163 A | 2/1999 | Kurtenbach | |
| 5,875,446 A | 2/1999 | Brown et al. | 707/3 |
| 5,878,410 A | 3/1999 | Zbikowski et al. | 707/2 |
| 5,899,995 A | 5/1999 | Millier et al. | 707/102 |
| 5,923,328 A * | 7/1999 | Griesmer | 715/854 |
| 5,929,854 A | 7/1999 | Ross | 715/783 |
| 5,933,139 A | 8/1999 | Feigner et al. | 715/738 |
| 5,935,210 A * | 8/1999 | Stark | 709/224 |
| 5,987,454 A | 11/1999 | Hobbs | 707/4 |
| 5,987,506 A | 11/1999 | Carter et al. | 709/213 |
| 6,003,040 A | 12/1999 | Mital et al. | 707/103 R |
| 6,008,806 A | 12/1999 | Nakajima et al. | 715/744 |
| 6,014,137 A | 1/2000 | Burns | 715/747 |
| 6,021,262 A | 2/2000 | Cote et al. | 714/48 |
| 6,023,708 A | 2/2000 | Mendez et al. | |
| 6,025,843 A | 2/2000 | Sklar | 715/841 |
| 6,037,944 A | 3/2000 | Hugh | 715/854 |
| 6,061,692 A | 5/2000 | Thomas et al. | 707/200 |
| 6,061,695 A | 5/2000 | Slivka et al. | 715/513 |
| 6,078,924 A | 6/2000 | Ainsbury et al. | 707/101 |
| 6,097,389 A | 8/2000 | Morris et al. | 715/804 |
| 6,144,968 A | 11/2000 | Zellweger | 707/104.1 |
| 6,147,601 A | 11/2000 | Sandelman et al. | 340/506 |
| 6,181,342 B1 | 1/2001 | Niblack | 345/635 |
| 6,202,061 B1 | 3/2001 | Khosla et al. | 707/3 |
| 6,237,011 B1 | 5/2001 | Ferguson et al. | 715/515 |
| 6,240,421 B1 | 5/2001 | Stolarz | 707/102 |
| 6,243,094 B1 | 6/2001 | Sklar | 715/853 |
| 6,243,724 B1 | 6/2001 | Mander et al. | 715/526 |
| 6,246,411 B1 | 6/2001 | Strauss | |
| 6,256,031 B1 | 7/2001 | Meijer et al. | 715/854 |
| 6,275,829 B1 | 8/2001 | Angiulo et al. | 707/104.1 |
| 6,308,173 B1 | 10/2001 | Glasser et al. | |
| 6,317,142 B1 | 11/2001 | Decoste et al. | 715/762 |
| 6,324,551 B1 | 11/2001 | Lamping et al. | 715/500 |
| 6,339,767 B1 | 1/2002 | Rivette et al. | 707/2 |
| 6,341,280 B1 | 1/2002 | Glass et al. | 707/3 |
| 6,363,377 B1 | 3/2002 | Kravets et al. | 707/4 |
| 6,363,400 B1 | 3/2002 | Chtchetkine et al. | |
| 6,401,097 B1 | 6/2002 | McCotter et al. | 707/102 |
| 6,411,311 B1 | 6/2002 | Rich et al. | 715/769 |
| 6,430,575 B1 | 8/2002 | Dourish et al. | 707/200 |
| 6,437,807 B1 | 8/2002 | Berquist et al. | |
| 6,448,985 B1 | 9/2002 | McNally | |
| 6,453,311 B1 | 9/2002 | Powers, III | 707/2 |
| 6,453,319 B1 | 9/2002 | Mattis et al. | |
| 6,466,238 B1 | 10/2002 | Berry et al. | 715/847 |
| 6,466,932 B1 | 10/2002 | Dennis et al. | |
| 6,480,835 B1 | 11/2002 | Light | 33/645 |
| 6,505,233 B1 | 1/2003 | Hanson et al. | 703/204 |
| 6,513,038 B1 | 1/2003 | Hasegawa et al. | 707/7 |
| 6,526,399 B1 | 2/2003 | Coulson et al. | 707/1 |
| 6,535,229 B1 | 3/2003 | Kraft | 715/764 |
| 6,535,230 B1 | 3/2003 | Celik | |
| 6,539,399 B1 | 3/2003 | Hazama et al. | 707/104.1 |
| 6,549,217 B1 | 4/2003 | De Greef et al. | 715/745 |
| 6,549,916 B1 | 4/2003 | Sedlar | 707/200 |
| 6,563,514 B1 | 5/2003 | Samar | |
| 6,573,906 B1 | 6/2003 | Harding et al. | |
| 6,573,907 B1 | 6/2003 | Madrane | 715/719 |
| 6,583,799 B1 | 6/2003 | Manolis et al. | 715/838 |
| 6,590,585 B1 | 7/2003 | Suzuki et al. | 715/719 |
| 6,606,105 B1 | 8/2003 | Quartetti | |
| 6,613,101 B2 | 9/2003 | Mander et al. | 715/526 |
| 6,628,309 B1 | 9/2003 | Dodson et al. | |
| 6,636,238 B1 | 10/2003 | Amir et al. | 715/730 |
| 6,636,250 B1 | 10/2003 | Gasser | 715/853 |
| 6,662,198 B2 | 12/2003 | Satyanarayanan et al. | |
| 6,684,222 B1 | 1/2004 | Cornelius et al. | 707/104.1 |
| 6,735,623 B1 | 5/2004 | Prust | |
| 6,738,770 B2 | 5/2004 | Gorman | 707/7 |
| 6,745,206 B2 | 6/2004 | Mandler et al. | 707/104.1 |
| 6,754,829 B1 | 6/2004 | Butt et al. | 726/8 |
| 6,762,776 B2 | 7/2004 | Huapaya | 715/802 |
| 6,762,777 B2 | 7/2004 | Carroll | |
| 6,763,458 B1 | 7/2004 | Watanabe et al. | |
| 6,768,999 B2 | 7/2004 | Prager et al. | 707/102 |
| 6,784,900 B1 | 8/2004 | Dobronsky et al. | |
| 6,795,094 B1 | 9/2004 | Watanabe et al. | 715/762 |
| 6,801,919 B2 | 10/2004 | Hunt et al. | 707/202 |
| 6,803,926 B1 | 10/2004 | Lamb et al. | 715/744 |
| 6,816,863 B2 | 11/2004 | Bates et al. | |
| 6,823,344 B1 | 11/2004 | Isensee et al. | 707/104.1 |
| 6,847,959 B1 | 1/2005 | Arrouye et al. | 707/2 |
| 6,853,391 B2 | 2/2005 | Bates et al. | 715/854 |
| 6,865,568 B2 | 3/2005 | Chau | 707/3 |
| 6,871,348 B1 | 3/2005 | Cooper | |
| 6,876,996 B2 | 4/2005 | Czajkowski et al. | 707/2 |
| 6,880,132 B2 | 4/2005 | Uemura | 715/848 |
| 6,883,009 B2 | 4/2005 | Yoo | |
| 6,883,146 B2 | 4/2005 | Prabhu et al. | 715/854 |
| 6,906,722 B2 | 6/2005 | Hrebejk et al. | 345/581 |
| 6,922,709 B2 | 7/2005 | Goodman | 707/203 |
| 6,938,207 B1 | 8/2005 | Haynes | |
| 6,944,647 B2 | 9/2005 | Shah et al. | 709/206 |
| 6,947,959 B1 | 9/2005 | Gill | |
| 6,950,818 B2 | 9/2005 | Dennis et al. | |
| 6,952,724 B2 | 10/2005 | Prust | |
| 6,980,993 B2 | 12/2005 | Horvitz et al. | 707/102 |
| 7,010,755 B2 | 3/2006 | Anderson et al. | |
| 7,051,291 B2 | 5/2006 | Sciammarella et al. | |
| 7,068,291 B1 | 6/2006 | Roberts et al. | 345/635 |
| 7,139,811 B2 | 11/2006 | Lev Ran et al. | |
| 7,203,948 B2 | 4/2007 | Mukundan et al. | |
| 2001/0034771 A1 | 10/2001 | Hutsch et al. | |
| 2001/0047368 A1 | 11/2001 | Oshinsky et al. | |
| 2001/0049675 A1 | 12/2001 | Mandler et al. | |
| 2001/0053996 A1 | 12/2001 | Atkinson | |
| 2001/0056434 A1 | 12/2001 | Kaplan et al. | |
| 2001/0056508 A1 | 12/2001 | Arneson et al. | |
| 2002/0019935 A1 | 2/2002 | Andrew et al. | |
| 2002/0033844 A1 | 3/2002 | Levy et al. | |
| 2002/0046232 A1 | 4/2002 | Adams et al. | |
| 2002/0046299 A1 | 4/2002 | Lefeber et al. | |
| 2002/0049717 A1 | 4/2002 | Routtenberg et al. | |
| 2002/0052885 A1 | 5/2002 | Levy | |
| 2002/0054167 A1 | 5/2002 | Hugh | |
| 2002/0059199 A1 | 5/2002 | Harvey | |
| 2002/0062310 A1 | 5/2002 | Marmor et al. | |
| 2002/0075310 A1 | 6/2002 | Prabhu et al. | |
| 2002/0075312 A1 | 6/2002 | Amadio et al. | |
| 2002/0075330 A1 | 6/2002 | Rosenzweig et al. | |
| 2002/0087740 A1 | 7/2002 | Castanho et al. | |
| 2002/0087969 A1 | 7/2002 | Brunheroto et al. | |
| 2002/0089540 A1 | 7/2002 | Geier et al. | |
| 2002/0091679 A1 | 7/2002 | Wright | |
| 2002/0091697 A1 | 7/2002 | Huang et al. | |
| 2002/0091739 A1 | 7/2002 | Ferlitsch et al. | |
| 2002/0095416 A1 | 7/2002 | Schwols | |
| 2002/0097278 A1 | 7/2002 | Mandler et al. | |
| 2002/0103998 A1 | 8/2002 | DeBruine | |
| 2002/0104069 A1 | 8/2002 | Gouge et al. | |
| 2002/0107973 A1 | 8/2002 | Lennon et al. | |
| 2002/0111942 A1 | 8/2002 | Campbell et al. | |
| 2002/0113821 A1 | 8/2002 | Hrebejk et al. | |
| 2002/0113824 A1 * | 8/2002 | Myers, Jr. | 345/810 |
| 2002/0120505 A1 | 8/2002 | Henkin et al. | |
| 2002/0120757 A1 | 8/2002 | Sutherland et al. | |

| | | |
|---|---|---|
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0184357 A1 | 12/2002 | Tracersat et al. |
| 2002/0188605 A1 | 12/2002 | Adya et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |
| 2003/0009484 A1 | 1/2003 | Hamanaka et al. |
| 2003/0014415 A1 | 1/2003 | Weiss et al. |
| 2003/0018657 A1 | 1/2003 | Monday |
| 2003/0018712 A1 | 1/2003 | Harrow et al. |
| 2003/0028610 A1 | 2/2003 | Pearson |
| 2003/0041178 A1 | 2/2003 | Brouk et al. |
| 2003/0046260 A1 | 3/2003 | Satyanarayanan et al. |
| 2003/0069893 A1 | 4/2003 | Kanai et al. |
| 2003/0069908 A1 | 4/2003 | Anthony et al. |
| 2003/0074356 A1 | 4/2003 | Kaler et al. |
| 2003/0078918 A1 | 4/2003 | Souvignier et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Ornoigui |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0163486 A1 | 8/2003 | Can Der Meulen |
| 2003/0177422 A1 | 9/2003 | Tararoukhine et al. |
| 2003/0184587 A1 | 10/2003 | Ording et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056896 A1 | 3/2004 | Doblmayr et al. |
| 2004/0068524 A1 | 4/2004 | Aboulhosn et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0111431 A1 | 6/2004 | Zeller |
| 2004/0117358 A1 | 6/2004 | Von Kaenel . |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0149481 A1 | 7/2005 | Hesselink et al. |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0080308 A1 | 4/2006 | Carpentier et al. |
| 2006/0129627 A1 | 6/2006 | Phillips et al. |
| 2006/0173873 A1 | 8/2006 | Prompt et al. |
| 2006/0200466 A1 | 9/2006 | Kaasten et al. |
| 2006/0200832 A1 | 9/2006 | Dutton |
| 2006/0218122 A1 | 9/2006 | Poston et al. |

FOREIGN PATENT DOCUMENTS

| | | |
|---|---|---|
| GB | 2329492 | 3/1999 |
| WO | 9938092 | 7/1999 |
| WO | 01/63919 A1 | 8/2001 |
| WO | WO 0225420 | 3/2002 |
| WO | WO 2004107151 | 9/2004 |

OTHER PUBLICATIONS

"Info Vision Infonnation Management System" http://66.1 02. 7.1 04/search?q=cache:m IXV6K6sQOQJ:www.amlib.netlproducts/infovision.htm+customised+multi+property+file+navigation &hl=en.

"Previewing Files in the Common Dialog" http://www .elitevb. comlcontentiO 1,0084,0 II.

"TdcFolderListView component" http://www.appcontrols. comlmanualsldiskcontrols/index.html?tdcfolderlistview.htm.

"Previewing Files" http://developer.apple.comldocumentation/QuickTimeIINMAC/QT/iqMovieToolbox.1a.htm.

"Text File Previewer 2.0 Beta" http://www .freedownloadscenter. comlUtilitiesIText—ViewerslText—File reviewer.html.

"Your Next OS: Windows 2006?" http://www.pcworld. comlnewsiarticle/O,aid,ll3'631,OO.asp.

"GetOpenFileName Function," downloaded from <http://msdn. microsoft.com>; date of first publication prior to Mar. 28, 2005; 2 pages.

"GetSaveFileName Function," downloaded from <http://msdn. microsoft.com>; date of first publication prior to Mar. 28, 2005; 2 pages.

"Using Common Dialog Boxes," downloaded from <http://msdn. microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn. microsoft.com>; date of first publication prior to Mar. 28, 2005; 2 pages.

"Common Dialog Box Library," downloaded from <http://msdn. microsoft.com>; date of first publication prior to Mar. 28, 2005; 8 pages.

"OpenFileName Structure," downloaded from <http://msdn. microsoft.com>; date of first publication prior to Mar. 28, 2005; 7 pages.

"Open and Save as Dialog Boxes," downloaded from <http://msdn. microsoft.com>; date of first publication prior to Mar. 29, 2005; 9 pages.

"Customizing common dialog boxes," downloaded from http:// msdn.microsoft.com; date for first publication prior to Apr. 20, 2005, 4 pages.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalkavalon/>; date of first publication prior to Mar. 31, 2005; 45 pages.

Windows Forms: Exploiting Windows Longhorn"Features from Within Your Application " (CLI 391); downloaded from http://msdn. microsoft.com/longhorn/pdcmaterials/pdctalksavalon/>; date of first publication prior to Mar. 31, 2005; 27 pages.

MessageBox Function; downloaded from <http://msdn.microsoft. com>; date of first publication prior to Mar. 31, 2005; 4 pages.

Creating and Installing Theme Files; downloaded from <http://msdn. microsoft.com>; date of first publication prior to Feb. 21, 2005; 4 pages.

"MessageBox Function"; downloaded from <http://msdn.microsoft. com>; date of first publication prior to Mar. 31, 2005; 4 pages.

"Creating and Installing Theme Files"; downloaded from <http:// msdn.microsoft.com>; date of first publication prior to Feb. 21, 2005; 4 pages.

"About Dialog Boxes"; downloaded from <http://msdn.microsoft. com>; date of first publication prior to Feb. 21, 2005; 10 pages.

"Property Sheets and Inspectors"; downloaded from <http://msdn. microsoft.com>; date of first publication prior to Feb. 21, 2005; 6 pages.

"Propsheetpage"; downloaded from <http://msdn.microsoft.com>; date of first publication prior to Feb. 21, 2005; 3 pages.

"DialogProc Function"; downloaded from <http://msdn.microsoft. com>; date of first publication prior to Feb. 21, 2005; 2 pages.

"Creating Wizards"; downloaded from <http://msdn.microsoft. com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn. microsoft.com>; date of first publication prior to Mar. 31, 2005; 5 pages.

"Drawitemstruct Structure"; downloaded from <http://msdn. microsoft.com>; date of first publication prior to Feb 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn. microsoft.com>; date of first publication prior to Feb. 25, 2005; 5 pages.

"Using Dialog Boxes"; downloaded from <http://msdn.microsoft. com>; date of first publication prior to Mar. 31, 2005; 8 pages.

"CreatePropertySheetPage Function"; downloaded from <http:// msdn.microsoft.com>; date of first publication prior to Mar. 31, 2005; 1 page.

"DestroyPropertySheetPage Function"; downloaded from <http:// msdn.microsoft.com>; date of first publication prior to Mar. 31, 2005; 1 page.

"PropertySheet Function"; downloaded from <http://msdn. microsoft.com>; date of first publication prior to Mar. 31, 2005, 2 pages.

"PropSheetPageProc Function"; downloaded from <http://msdn. microsoft.com>; date of first publication prior to Mar. 31, 2005; 2 pages.

"PropSheetProc Function"; downloaded from <http://msdn. microsoft.com>; date of first publication prior to Mar. 31, 2005; 2 pages.

"PSN_KILLACTIVE Notification"; downloaded from <http:// msdn.microsoft.com>; date of first publication prior to Mar. 21, 2005; 1 page.

"PSN_QUERYCANCEL Notification"; downloaded from <http:// msdn.microsoft.com>; date of first publication prior to Mar. 31, 2005; 1 page.

"PSN_RESET Notification"; downloaded from <http://msdn. microsoft.com>; date of first publication prior to Mar. 31, 2005; 1 page.

"PSN_SETACTIVE Notification"; downloaded from <http://msdn. microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn. microsoft.com>; date of first publication prior to Mar. 13, 2005; 3 pages.

"PSN_WIZFINISH Notification"; downloaded from <http://msdn. microsoft.com>; date of first publication prior to Mar. 31, 2005; 1 page.

"PSN_WIZNEXT Notification"; downloaded from <http://msdn. microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message"; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005 ; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"PROPSHEETHEADER Structure"; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

A. T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages With Rules", Microsoft® Outlook® 2003 Help file, 3 pp.

Microsoft Windows XP Version 2002 (Screen Dumps, Figs. 1-16).

Simpson, Alan, Windows 95 Uncut, 1995, IDG Books Worldwide, Inc., pp. 104-107.

Feng, et al., "Schemata Transformation of Object-Oriented Conceptual Models to XML", Computer systems Science & Engineering, vol. 18, No. 1, Jan. 2003.

Joseph, M., "The UML for Data Modellers," Elektron, Apr. 2004, pp. 72-73.

Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

Cohen, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Wikipedia, File Allocation Table, 2006, <http://en.wikipedia.org/wiki/File_Allocation_Table>.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Windows Commander, <http://web.archive.org/web/20030207145141/www.ghisler.com/featurel.htm> (Feb. 7, 2003) and <http://web/archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8. Chapter 11: Sights and Sounds: Music and Other Multimedia-printed pp. 1-3.

Stanek R. William, "Microsoft Windows XP ProfessionaL Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

McFedries, Paul; "The Complete Idiot's Guide to Windows XP", Table of Contents, Oct. 3, 2001; Alpha Books, Ch. 6: Using My Computer to Fiddle w/h Files and Folder-printed pp. 1-6, Finding a File in Mess p. 103.

Langer, Maria, Mac OS X: Visual QuickStart Guide; Apr. 2001, PeachPit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/featurel.html, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39, 1995.

Piernas, J., et al., "DuallFS: A New Journaling File System Without Meta-Data Duplication," Conference Proceedings of the 2002 International Conference on SuperComputing, New York, Jun. 22-26, 2002, p. 137-146.

Manber, U., and S. Wu, "Glimpse: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th Euromicro Conference (Euromicro'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery; Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

Yuangui Lei, Enrico Motta, John Domingue: "An Ontology-Driven Approach to Web Site Generation and Maintenance" Springer [Online] 2002, pp. 219-234, XP002481234 Walton Hall, MK7 6AA, England www.citeseer.com [retrieved on May 22, 2008] *the whole document*.

Tobias Kunze, Jan Brase, Wolfgang Nejdl: "Editing Learning Object Metadata: Schema Driven Input of RDF Metadata with the OLR3-Editor" Wissenbasierte Systeme, [Online] 2002, XP002481235 Hannover, Germany Retrieved from the Internet.

Mischa Weiss-Lijn, Janet McDonnell, Leslie James: "Supporting Document Use Through Interactive Visualization of Metadata" University of College, London, [Online] 2001, XP002481236 London WC1E 6BT, UK www.citeseer.com [retrieved on May 22, 2008] *the whole document*.

G. D. Venolia et al. *Supporting Email Workflow*. Microsoft Research Technical Report MSR-TR-2001-88. Revised Dec. 2001 (Original Sep. 2001). Microsoft Corporation, Richmond, WA.

G. Venolia and C. Neustaedter. *Understanding Sequence and Reply Relationships within Email Conversations: A Mixed-Model Visualization*. Microsoft Research Technical Report MSR-TR-2002-102. Sep. 23, 2002 (Revised Jan. 13, 2003).

Microsoft Digital Image Suite User's Manual, Version 9.0. pp. 105-118. Available: http://www.microsoft.com/products/imaging/guides/SuiteManual.pdf, Apr. 30, 2004.

"Using Tags to Organize Your Photos." Adobe Photoshop Album 2.0 Tutorial. Available: http://www.adobe.com/digitalimag/tips/phsaltaggin/pdfs/phsaltaggin.pdf, Apr. 30, 2004.

* cited by examiner

FIG. 2

| | Song Title | Time | Album | Genre | Rating | Count |
|---|---|---|---|---|---|---|
| Filter by... | | | | | | |
| Music Links ▼ — 207 | • Scooter | 3:06 | Music For the Morning | Alternative Country | ☆☆☆ | 1 |
| ☐ All Songs — 209 | • Sleep Alone | 6:34 | Great Expectations Soun... | Alternative Country | ☆☆☆☆☆ | 5 |
| ☐ Online Store — 211 | • Metro Area | 8:23 | Great Expectations Soun... | Alternative Country | ☆☆ | 6 |
| ☐ IPod — 213 | • Hollywood | 1:21 | Great Expectations Soun... | Electronic | ☆☆☆☆☆ | 2 |
| ⟳ Recently played — 215 | • If I were you | 2:32 | Great Expectations Soun... | Electronic | ☆☆☆☆ | 3 |
| ☆ Rating — 217 | • Mad World | 6:56 | A Bugged out Mix | Electronic | ☆ | 23 |
| ▥ Playlists — 219 | • Silk Road | 3:06 | A Bugged out Mix | Electronic | ☆☆☆☆ | 7 |
| ◯ Artists — 221 | • Dust | 6:34 | A Bugged out Mix | Electronic | ☆☆☆ | 10 |
| ◯ Genre — 223 | • Encounter | 8:23 | Time for a Dance | Pop | ☆☆☆☆☆ | 8 |
| | • Forest | 1:21 | Come Away with Me | Pop | ☆☆☆☆ | 50 |
| | • Hippies I h... | 2:32 | Come Away with Me | Rock | ☆☆☆ | 10 |
| 203 ◁ 205 ↗ | • Spread YW... | 6:56 | Come Away with Me | Rock | ☆☆☆☆☆ | 23 |
| | • Down to Up... | 3:06 | Come Away with Me | Rock | ☆☆☆☆ | 50 |
| | • Top | 1:21 | Come Away with Me | Rock | ☆ | 10 |
| | • Rough Jump | 1:21 | Great Expectations Soun... | Rock | ☆☆☆☆ | 23 |
| | • Run Around | 2:32 | Great Expectations Soun... | Rock | ☆☆ | 50 |
| ▦ View | • Tweet | 6:56 | | Soundtrack | ☆☆ | 3 |
| | • Just You | 3:06 | | Soundtrack | ☆☆☆☆☆ | 53 |
| | ◁ 201 | | | | | |

FIG. 3

| | Song Title | Time | Album | Genre | Rating | Count |
|---|---|---|---|---|---|---|
| Filter by... | | | | | | |
| Music Links ▼ | | | | | | |
| ☐ All Songs | • Scooter | 3:06 | Music For the Morning | Alternative Country | ☆☆☆ | 1 |
| ☐ Online Store | • Sleep Alone | 6:34 | Great Expectations Soun... | Alternative Country | ☆☆☆☆ | 5 |
| ⊞ ☐ IPod — 213 | • Metro Area | 8:23 | Great Expectations Soun... | Alternative Country | ☆☆ | 6 |
| | • Hollywood | 1:21 | Great Expectations Soun... | Electronic | ☆☆☆☆☆ | 2 |
| ⊞ ☆ Recently played | • If I were you | 2:32 | Great Expectations Soun... | Electronic | ☆☆☆☆ | 3 |
| ⊞ ☆ Rating — 217 | • Mad World | 6:56 | A Bugged out Mix | Electronic | ☆ | 23 |
| ⊞ ☰ Playlists — 219 | • Silk Road | 3:06 | A Bugged out Mix | Electronic | ☆☆☆☆ | 7 |
| ⊞ ◯ Artists — 221 | • Dust | 6:34 | A Bugged out Mix | Electronic | ☆☆☆ | 10 |
| ⊞ ◯ Genre — 223 | • Encounter | 8:23 | Time for a Dance | Pop | ☆☆☆☆☆ | 8 |
| | • Forest | 1:21 | Come Away with Me | Pop | ☆☆☆☆ | 50 |
| ⇖ 325 | • Hippies I h... | 2:32 | Come Away with Me | Rock | ☆☆☆ | 10 |
| 203 | • Spread YW... | 6:56 | Come Away with Me | Rock | ☆☆☆☆☆ | 23 |
| | • Down to Up... | 3:06 | Come Away with Me | Rock | ☆☆☆☆ | 50 |
| | • Top | 1:21 | Come Away with Me | Rock | ☆ | 10 |
| ▦ View | • Rough Jump | 1:21 | Great Expectations Soun... | Rock | ☆☆☆ | 23 |
| | • Run Around | 2:32 | Great Expectations Soun... | Soundtrack | ☆☆ | 50 |
| | • Tweet | 6:56 | Great Expectations Soun... | Soundtrack | ☆☆ | 3 |
| | • Just You | 3:06 | Great Expectations Soun... | Soundtrack | ☆☆☆☆☆ | 53 |

| | Song Title | Time | Album | Genre | Rating | Count |
|---|---|---|---|---|---|---|
| Filter by... | | | | | | |
| Music Links ▼ | | | | | | |
| ☐ All Songs | · Scooter | 3:06 | Music For the Morning | Alternative Country | ☆☆☆ | 1 |
| ☐ Online Store | · Sleep Alone | 6:34 | Great Expectations Soun... | Alternative Country | ☆☆☆☆☆ | 5 |
| ⊞ ☐ IPod | · Metro Area | 8:23 | Great Expectations Soun... | Alternative Country | ☆☆ | 6 |
| ⊙ Recently played | · Hollywood | 1:21 | Great Expectations Soun... | Electronic | ☆☆☆☆☆ | 2 |
| ⊞ ☆ Rating | · If I were you | 2:32 | Great Expectations Soun... | Electronic | ☆☆☆☆ | 3 |
| ⊞ ▦ Playlists | · Mad World | 6:56 | A Bugged out Mix | Electronic | ☆ | 23 |
| ⊞ ⊙ Artists —221 | · Silk Road | 3:06 | A Bugged out Mix | Electronic | ☆☆☆☆ | 7 |
| ⊞ ⊙ Genre 437 | · Dust | 6:34 | A Bugged out Mix | Electronic | ☆☆ | 10 |
| △ | · Encounter | 8:23 | Time for a Dance | Pop | ☆☆☆☆☆ | 8 |
| 203 △ 205 | · Forest | 1:21 | Come Away with Me | Pop | ☆☆☆☆ | 50 |
| | · Hippies I h... | 2:32 | Come Away with Me | Rock | ☆☆ | 10 |
| | · Spread YW... | 6:56 | Come Away with Me | Rock | ☆☆☆☆☆ | 23 |
| | · Down to Up... | 3:06 | Come Away with Me | Rock | ☆☆☆ | 50 |
| | · Top | 1:21 | Come Away with Me | Rock | ☆ | 10 |
| | · Rough Jump | 1:21 | Great Expectations Soun... | Rock | ☆☆☆ | 23 |
| | · Run Around | 2:32 | Great Expectations Soun... | Soundtrack | ☆☆ | 50 |
| | · Tweet | 6:56 | Great Expectations Soun... | Soundtrack | ☆☆☆ | 3 |
| ▦ View | · Just You | 3:06 | Great Expectations Soun... | Soundtrack | ☆☆☆☆☆ | 53 |

FIG. 5

| | Song Title | Time | Album | Genre | Rating | Count |
|---|---|---|---|---|---|---|
| | Scooter | 3:06 | Music For the Morning | Alternative Country | ☆☆☆ | 1 |
| | Sleep Alone | 6:34 | Great Expectations Soun... | Alternative Country | ☆☆☆☆☆ | 5 |
| | Metro Area | 8:23 | Great Expectations Soun... | Alternative Country | ☆☆☆ | 6 |
| | Hollywood | 1:21 | Great Expectations Soun... | Electronic | ☆☆☆☆☆ | 2 |
| | If I were you | 2:32 | Great Expectations Soun... | Electronic | ☆☆☆☆ | 3 |
| | Mad World | 6:56 | A Bugged out Mix | Electronic | ☆ | 23 |
| | Silk Road | 3:06 | A Bugged out Mix | Electronic | ☆☆☆☆ | 7 |
| | Dust | 6:34 | A Bugged out Mix | Electronic | ☆☆☆ | 10 |
| | Encounter | 8:23 | Time for a Dance | Pop | ☆☆☆☆☆ | 8 |
| | Forest | 1:21 | Come Away with Me | Pop | ☆☆☆☆ | 50 |
| | Hippies I h... | 2:32 | Come Away with Me | Rock | ☆☆☆ | 10 |
| | Spread YW... | 6:56 | Come Away with Me | Rock | ☆☆☆☆☆ | 23 |
| | Down to Up... | 3:06 | Come Away with Me | Rock | ☆☆☆☆ | 50 |
| | Top | 1:21 | Come Away with Me | Rock | ☆ | 10 |
| | Rough Jump | 1:21 | Come Away with Me | Rock | ☆☆☆ | 23 |
| | Run Around | 2:32 | Come Away with Me | Rock | ☆☆☆ | 50 |
| | Tweet | 6:56 | Great Expectations Soun... | Soundtrack | ☆ | 3 |
| | Just You | 3:06 | Great Expectations Soun... | Soundtrack | ☆☆☆☆☆ | 53 |

Filter by...

Music Links ▾
- All Songs
- Online Store
- iPod
- ☆ Rating
- Recently played
- Playlists
- Artists — 221
- Genre View

FIG. 6

| Filter by... | | | | | |
|---|---|---|---|---|---|
| | Song Title | Time | Album | Genre | Rating | Count |
| Music Links ▼ | | | | | | |
| ☐ All Songs | • Scooter | 3:06 | Music For the Morning | Alternative Country | ☆☆☆ | 1 |
| ☐ Online Store | • Sleep Alone | 6:34 | Great Expectations Soun... | Alternative Country | ☆☆☆☆ | 5 |
| ⊞ ☐ iPod | • Metro Area | 8:23 | Great Expectations Soun... | Alternative Country | ☆☆ | 6 |
| ⊞ ⊘ Recently played | • Hollywood | 1:21 | Great Expectations Soun... | Electronic | ☆☆☆☆☆ | 2 |
| ⊞ ☆ Rating | • If I were you | 2:32 | Great Expectations Soun... | Electronic | ☆☆☆ | 3 |
| ⊞ ☰ Playlists | • Mad World | 6:56 | A Bugged out Mix | Electronic | ☆ | 23 |
| ⊟ ⊘ Artists — 221 | • Silk Road | 3:06 | A Bugged out Mix | Electronic | ☆☆☆☆ | 7 |
| ○ Madonna — 643 | • Dust | 6:34 | A Bugged out Mix | Electronic | ☆☆☆ | 10 |
| ○ 50 Cent — 645 | • Encounter | 8:23 | Time for a Dance | Pop | ☆☆☆☆☆ | 8 |
| ○ Chocolate — 647 | • Forest | 1:21 | Come Away with Me | Pop | ☆☆☆☆ | 50 |
| ○ Kruder & Dorfmei... — 649 | • Hippies I h... | 2:32 | Come Away with Me | Rock | ☆☆☆☆☆ | 10 |
| ○ Eminem — 651 | • Spread YW... | 6:56 | Come Away with Me | Rock | ☆☆☆☆ | 23 |
| ▽ | • Down to Up... | 3:06 | Come Away with Me | Rock | ☆ | 50 |
| ⊞ ⊘ Genre | • Top | 1:21 | Come Away with Me | Rock | ☆☆☆ | 10 |
| | • Rough Jump | 2:32 | Great Expectations Soun... | Rock | ☆☆☆ | 23 |
| ⊞⊞ View 203 | • Run Around | 1:21 | | | | |
| | • Tweet | 6:56 | | Soundtrack | ☆ | 50 |
| | • Just You | 3:06 | Great Expectations Soun... | Soundtrack | ☆☆☆☆ | 3 |
| | | | | | ☆☆☆☆☆ | 53 |

| Song Title | Time | Album | Genre | Rating | Count |
|---|---|---|---|---|---|
| Scooter | 3:06 | Music For the Morning | Alternative Country | ☆☆☆☆☆ | 1 |
| Sleep Alone | 6:34 | Great Expectations Soun... | Alternative Country | ☆☆☆☆☆ | 5 |
| Metro Area | 8:23 | Great Expectations Soun... | Alternative Country | ☆☆☆☆☆ | 6 |
| Hollywood | 1:21 | Great Expectations Soun... | Electronic | ☆☆☆☆☆ | 2 |
| If I were you | 2:32 | Great Expectations Soun... | Electronic | ☆☆☆☆☆ | 3 |
| Mad World | 6:56 | A Bugged out Mix | Electronic | ☆☆☆☆☆ | 23 |
| Silk Road | 3:06 | A Bugged out Mix | Electronic | ☆☆☆☆☆ | 7 |
| Dust | 6:34 | A Bugged out Mix | Electronic | ☆☆☆☆☆ | 10 |
| Encounter | 8:23 | Time for a Dance | Pop | ☆☆☆☆☆ | 8 |
| Forest | 1:21 | Come Away with Me | Pop | ☆☆☆☆☆ | 50 |
| Hippies I h... | 2:32 | Come Away with Me | Rock | ☆☆☆☆☆ | 10 |
| Spread YW... | 6:56 | Come Away with Me | Rock | ☆☆☆☆☆ | 23 |
| Down to Up... | 3:06 | Come Away with Me | Rock | ☆☆☆☆☆ | 50 |
| Top | 1:21 | Come Away with Me | Rock | ☆☆☆☆☆ | 10 |
| Rough Jump | 2:32 | Come Away with Me | Rock | ☆☆☆☆☆ | 23 |
| | 6:56 | ...ctations Soun... | Soundtrack | ☆☆☆☆☆ | 3 |
| | 3:06 | ...ctations Soun... | Soundtrack | ☆☆☆☆☆ | 53 |

Filter by...

Music Links ▾
- All Songs
- Online Store
- IPod
- Recently played
- ☆ Rating
- Playlists
- Artists
  - Madonna
  - 50 Cent
  - Chocolate
  - Kruder & Dorfmei...
  - Eminem 4tuoze - Chocolate 871
De Dijk - K3 873
Kruder... - Night Vision 875
OxyGen - Prince 877
Sheryl Crowe - ZZ Top 879
859

| | Song Title | Time | Album | Genre | Rating | Count |
|---|---|---|---|---|---|---|
| *Filter by...* | | | | | | |
| Music Links ▼ | | | | | | |
| ☐ All Songs | • Scooter | 3:06 | Music For the Morning | Alternative | ★★★☆☆ | 1 |
| ☐ Online Store | • Sleep Alone | 6:34 | Great Expectations Soun... | Alternative Country | ★★★★☆ | 5 |
| ☐ ⊞ iPod | • Metro Area | 8:23 | Great Expectations Soun... | Alternative Country | ★★☆☆☆ | 6 |
| | • Hollywood | 1:21 | Great Expectations Soun... | Electronic | ★★★★★ | 2 |
| ⓘ Recently played | • If I were you | 2:32 | Great Expectations Soun... | Electronic | ★★★★☆ | 3 |
| ⊞ ☆ Rating | • Mad World | 6:56 | A Bugged out Mix | Electronic | ★☆☆☆☆ | 23 |
| ⊞ ▤ Playlists | • Silk Road | 3:06 | A Bugged out Mix | Electronic | ★★★★☆ | 7 |
| ⊟ ⓘ Artists | • Dust | 6:34 | A Bugged out Mix | Electronic | ★★☆☆☆ | 10 |
| ○ Madonna | • Encounter | 8:23 | Time for a Dance | Pop | ★★★★★ | 8 |
| ○ 50 Cent | • Forest | 1:21 | Come Away with Me | Pop | ★★★★☆ | 50 |
| ○ Chocolate —985 | • Hippies I h... | 2:32 | Come Away with Me | Rock | ★★☆☆☆ | 10 |
| ○ Kruder & Dorfmeister | • Spread YW... | 6:56 | Come Away with Me | Rock | ★★★★★ | 23 |
| ○ Eminem | • Down to Up... | 3:06 | Come Away with Me | Rock | ★★★★☆ | 50 |
| ▸ 983 | • Top | 1:21 | Come Away with Me | Rock | ★☆☆☆☆ | 10 |
| | • Rough Jump | 1:21 | Come Away with Me | Rock | ★★★☆☆ | 23 |
| ⊞ ⓘ Genre | • Run Around | 2:32 | Great Expectations Soun... | Soundtrack | ★★☆☆☆ | 50 |
| | • Tweet | 6:56 | Great Expectations Soun... | Soundtrack | ★★☆☆☆ | 3 |
| ▦ View | • Just You | 3:06 | | | ★★★★★ | 53 |

FIG. 10

| | Song Title | Time | Album | Genre | Rating | Count |
|---|---|---|---|---|---|---|
| Filter by... | | | | | | |
| Music Links ▼ | • Scooter | 3:06 | Music For the Morning | Alternative Country | ☆☆☆ | 1 |
| ☐ All Songs | • Sleep Alone | 6:34 | Great Expectations Soun... | Alternative Country | ☆☆☆☆☆ | 5 |
| ☐ Online Store | • Metro Area | 8:23 | Great Expectations Soun... | Alternative Country | ☆☆☆ | 6 |
| ☐ ☐ iPod | • Hollywood | 1:21 | Great Expectations Soun... | Electronic | ☆☆☆☆☆ | 2 |
| ⊕ Recently played | • If I were you | 2:32 | Great Expectations Soun... | Electronic | ☆☆☆☆☆ | 3 |
| ⊕ ☆ Rating | • Mad World | 6:56 | A Bugged out Mix | Electronic | ☆ | 23 |
| ⊕ ▦ Playlists | • Silk Road | 3:06 | A Bugged out Mix | Electronic | ☆☆☆☆ | 7 ⎫ 1097 |
| | • Dust | 6:34 | A Bugged out Mix | Electronic | ☆☆ | 10 ⎭ |
| ☐ ⊕ Artists — 221 | ⊙ Encounter | 8:23 | Time for a Dance | Pop | ★★★★☆ | 8 |
| ☐ ○ Madonna | • Forest | 1:21 | Come Away with Me | Pop | ☆☆☆☆ | 50 |
| ☑ ○ 50 Cent | • Hippies I h... | 2:32 | Come Away with Me | Rock | ☆☆☆☆☆ | 10 |
| ☐ ○ Chocolate | • Spread YW... | 6:56 | Come Away with Me | Rock | ☆☆ | 23 |
| ☐ ○ Kruder & Dorfm... | • Down to Up... | 3:06 | Come Away with Me | Rock | ☆☆☆☆☆ | 50 |
| ☐ ○ Eminem | • Top | 1:21 | Come Away with Me | Rock | ☆☆☆☆ | 10 |
| ▽ | • Rough Jump | 1:21 | Come Away with Me | Rock | ☆ | 23 |
| ⊕ ⊙ Genre | • Run Around | 2:32 | Come Away with Me | Rock | ☆☆☆☆ | 50 |
| ▦ View 205 | • Tweet | 6:56 | Great Expectations Soun... | Soundtrack | ☆☆ | 3 |
| | • Just You | 3:06 | Great Expectations Soun... | Soundtrack | ☆☆☆☆☆ | 53 |

| Filter by... | | | | | |
|---|---|---|---|---|---|
| Music Links ▼ | Song Title | Time | Album | Genre | Rating | Count |
| ☐ All Songs | • Scooter | 3:06 | Music For the Morning | Alternative Country | ☆☆☆ | 1 |
| ☐ Online Store | • Sleep Alone | 6:34 | Great Expectations Soun... | Alternative Country | ☆☆☆☆ | 5 |
| ⊞ ☐ IPod | • Metro Area | 8:23 | Great Expectations Soun... | Alternative Country | ☆☆☆ | 6 |
|  | • Hollywood | 1:21 | Great Expectations Soun... | Electronic | ☆☆☆☆☆ | 2 |
| ⌖ Recently played | • If I were you | 2:32 | A Bugged out Mix | Electronic | ☆☆☆☆ | 3 |
| ⊞ ☆ Rating | • Mad World | 6:56 | A Bugged out Mix | Electronic | ☆ | 23 |
| ⊞ ▦ Playlists ～221 | • Silk Road | 3:06 | A Bugged out Mix | Electronic | ☆☆☆ | 7 |
| ☐ ♪ Artists | • Dust | 6:34 | Time for a Dance | Electronic | ☆☆ | 10 |
| ○ Madonna | Show All Music by Artist ～1209 1207 | | Come Away with Me | Pop | ☆☆☆☆ | 8 |
| ○ 50 Cent | Add new Artist ～1211 1205 | | Come Away with Me | Pop | ☆☆☆☆ | 50 |
| ○ Chocolate | Rename ～1211 | | Come Away with Me | Rock | ☆☆☆ | 10 |
| ○ Kruder & [ | Move Up ～1213  1215 | | Come Away with Me | Rock | ☆☆☆☆☆ | 23 |
| ○ Eminem | Move Down ～1215 | | Come Away with Me | Rock | ☆☆☆ | 50 |
| ▽ | Add / Remove Music Links | | | Rock | ☆ | 10 |
| ⊞ ♫ Genre | | | | Rock | ☆☆☆ | 23 |
| ▦▦ View ～203 | • Tweet | 6:56 | Great Expectations Soun... | Soundtrack | ☆☆ | 3 |
|  | • Just You | 3:06 | Great Expectations Soun... | Soundtrack | ☆☆☆☆☆ | 53 |

FIG. 13

| | Song Title | Time | Album | Genre | Rating | Count |
|---|---|---|---|---|---|---|
| Filter by... | | | | | | |
| Music Links ▾ | | | | | | |
| ☐ All Songs | • Scooter | 3:06 | Music For the Morning | Alternative | ☆☆☆ | 1 |
| ☐ Online Store | • Sleep Alone | 6:34 | Great Expectations Soun... | Alternative Country | ☆☆☆☆ | 5 |
| ⊞ ☐ IPod | • Metro Area | 8:23 | Great Expectations Soun... | Alternative Country | ☆☆☆ | 6 |
| | • Hollywood | 1:21 | Great Expectations Soun... | Alternative Country | ☆☆☆☆☆ | 2 |
| ⏱ Recently played | • If I were you | 2:32 | Great Expectations Soun... | Electronic | ☆☆☆☆ | 3 |
| ⊞ ☆ Rating | • Mad World | 6:56 | A Bugged out Mix | Electronic | ☆ | 23 |
| ⊞ ▦ Playlists | • Silk Road | 3:06 | A Bugged out Mix | Electronic | ☆☆ | 7 |
| ⊟ ♫ Artists | • Dust | 6:34 | A Bugged out Mix | Electronic | ☆☆☆☆☆ | 10 |
| ○ Madonna | • Encounter | 8:23 | Time for a Dance | Pop | ☆☆☆☆ | 8 |
| ○ 50 Cent | • Forest | 1:21 | Come Away with Me | Pop | ☆☆☆☆☆ | 50 |
| ○ Chocolate | • Hippies I h... | 2:32 | Come Away with Me | Rock | ☆☆☆ | 10 |
| ○ Kruder & Dorfmei... | • Spread YW... | 6:56 | Come Away with Me | Rock | ☆☆☆☆☆ | 23 |
| ○ Eminem | • Down to Up... | 3:06 | Come Away with Me | Rock | ☆☆☆ | 50 |
| ○ *New Artist* | • Top | 1:21 | Come Away with Me | Rock | ☆ | 10 |
| ▸ | • Rough Jump | 1:21 | Come Away with Me | Rock | ☆☆☆ | 23 |
| ⊞ ♫ Genre | • Run Around | 2:32 | Great Expectations Soun... | Soundtrack | ☆ | 50 |
| | • Tweet | 6:56 | | Soundtrack | ☆☆ | 3 |
| ▦ View 203 | • Just You | 3:06 | Great Expectations Soun... | | ☆☆☆☆☆ | 53 |

| Filter by... | | | | | |
|---|---|---|---|---|---|
| Music Links ▾ | Song Title | Time | Album | Genre | Rating | Count |
| ☐ All Songs | | | | | | |
| ☐ Online Store | • Scooter | 3:06 | Music For the Morning | Alternative Country | ☆☆☆ | 1 |
| ⊞ ☐ iPod | • Sleep Alone | 6:34 | Great Expectations Soun... | Alternative Country | ☆☆☆☆☆ | 5 |
| ⊘ Recently played | • Metro Area | 8:23 | Great Expectations Soun... | Alternative Country | ☆☆☆ | 6 |
| ⊞ ☆ Rating  219  1419 | • Hollywood | 1:21 | Great Expectations Soun... | Electronic | ☆☆☆☆☆ | 2 |
| ⊟ ☰ Playlists | • If I were you | 2:32 | Great Expectations Soun... | Electronic | ☆☆☆☆ | 3 |
| ☐ Haloween Party | • Mad World | 6:56 | A Bugged out Mix | Electronic | ☆ | 23 |
| ⊟☐ Coast to Coast trip | • Silk Road | 3:06 | A Bugged out Mix | Electronic | ☆☆☆☆ | 7 |
| ☐ Xmas 2003  1423  1421 | • Dust | 6:34 | A Bugged out Mix | Electronic | ☆☆ | 10 |
| ▾ | • Encounter | 8:23 | Time for a Dance | Electronic | ☆☆☆☆☆ | 8 |
| ⊘ Artists | • Forest | 1:21 | Come Away with Me | Pop | ☆☆☆☆ | 50 |
| ⊘ Genre  1425 | • Hippies I h... | 2:32 | Come Away with Me | Pop | ☆ | 10 |
| △ | • Spread YW... | 6:56 | Come Away with Me | Rock | ☆☆☆☆☆ | 23 |
|   203 | • Down to Up... | 3:06 | Come Away with Me | Rock | ☆☆☆ | 50 |
| ▦ View | • Top | 1:21 | Come Away with Me | Rock | ☆ | 10 |
| ▦▦ | • Rough Jump | 1:21 | Come Away with Me | Rock | ☆☆☆ | 23 |
| | • Run Around | 2:32 | Great Expectations Soun... | Rock | ☆☆☆ | 50 |
| | • Tweet | 6:56 | Great Expectations Soun... | Soundtrack | ☆☆ | 3 |
| | • Just You | 3:06 | Great Expectations Soun... | Soundtrack | ☆☆☆☆☆ | 53 |

FIG. 15

| Filter by... | | Song Title | Time | Album | Genre | Rating | Count |
|---|---|---|---|---|---|---|---|
| Music Links ▾ | | | | | | | |
| ☐ All Songs | • | Scooter | 3:06 | Music For the Morning | Alternative Country | ☆☆☆ | 1 |
| ☐ Online Store | • | Sleep Alone | 6:34 | Great Expectations Soun... | Alternative Country | ☆☆☆☆ | 5 |
| ⊞ ☐ iPod | • | Metro Area | 8:23 | Great Expectations Soun... | Alternative Country | ☆☆ | 6 |
| ⊘ Recently played | • | Hollywood | 1:21 | Great Expectations Soun... | Electronic | ☆☆☆☆☆ | 2 |
| ⊞ ☆ Rating  219  1419 | • | If I were you | 2:32 | Great Expectations Soun... | Electronic | ☆☆☆ | 3 |
| ⊟ ☰ Playlists | • | Mad World | 6:56 | A Bugged out Mix | Electronic | ☆ | 23 |
| ☐ Haloween Party | • | Silk Road | 3:06 | A Bugged out Mix | Electronic | ☆☆☆☆ | 7 |
| ⊟ ☐ Coast to Coast trip | • | Dust | 6:34 | A Bugged out Mix | Electronic | ☆☆ | 10 |
| ☐ Cruising  1421 | • | Encounter | 8:23 | Time for a Dance | Pop | ☆☆☆☆☆ | 8 |
| ⊟ ☐ Specials | • | Forest | 1:21 | Come Away with Me | Pop | ☆☆☆ | 50 |
| 1529 ☐ Mountain High | • | Hippies I h... | 2:32 | Come Away with Me | Rock | ☆☆☆☆☆ | 10 |
| 1531 ☐ Beach Songs  1533 | • | Spread YW... | 6:56 | Come Away with Me | Rock | ☆☆ | 23 |
| ☐ Xmas 2003 | • | Down to Up... | 3:06 | Come Away with Me | Rock | ☆☆☆☆☆ | 50 |
| ▽  1423 | • | Top | 1:21 | Come Away with Me | Rock | ☆☆☆ | 10 |
| | • | Rough Jump | 2:32 | Great Expectations Soun... | Rock | ☆ | 23 |
| ⊞⊞ View  203 | • | Run Around | 6:56 | Great Expectations Soun... | Soundtrack | ☆☆☆ | 50 |
| | • | Tweet | 6:56 | | | ☆☆ | 3 |
| | • | Just You | 3:06 | | | ☆☆☆☆ | 53 |

| | Song Title | Time | Album | Genre | Rating | Count |
|---|---|---|---|---|---|---|
| Filter by... | | | | | | |
| Music Links ▼ | | | | | | |
| ☐ All Songs | · Scooter | 3:06 | Music For the Morning | Alternative Country | ☆☆☆ | 1 |
| ☐ Online Store — 215 | · Sleep Alone | 6:34 | Great Expectations Soun... | Alternative Country | ☆☆☆☆ | 5 |
| ☐ iPod — 1637 | · Metro Area | 8:23 | Great Expectations Soun... | Alternative Country | ☆☆ | 6 |
| ⊕ ⓘ Recently played — 1635 | · Hollywood | 1:21 | Great Expectations Soun... | Electronic | ☆☆☆☆☆ | 2 |
| ⊕ ☆ Rating | · If I were you | 2:32 | A Bugged out Mix | Electronic | ☆☆☆☆ | 3 |
| ⊕ ☰ Playlists | Show "Recently played" — 1643 | | A Bugged out Mix | Electronic | ☆ | 23 |
| ⊕ ◷ Artists | Specific node task 1 — 1645 | | A Bugged out Mix | Electronic | ☆☆☆ | 7 |
| ⊕ ♫ Genre | Specific node task 2 — 1647  1641 | | Time for a Dance | Electronic | ☆☆ | 10 |
| | Delete — 1649 | | Come Away with Me | Pop | ☆☆☆☆ | 8 |
| △ 203 | Rename — 1651 | | Come Away with Me | Pop | ☆☆☆☆ | 50 |
| | Move Up — 1653 | | Come Away with Me | Rock | ☆☆☆☆ | 10 |
| | Move Down — 1655 | | Come Away with Me | Rock | ☆☆☆☆ | 23 |
| | Add / Remove Music Links | | Come Away with Me | Rock | ☆ | 50 |
| | · Run Around | 2:32 | Come Away with Me | Rock | ☆☆ | 10 |
| ⊞ View | · Tweet | 6:56 | Great Expectations Soun... | Soundtrack | ☆ | 23 |
| | · Just You | 3:06 | Great Expectations Soun... | Soundtrack | ☆☆☆☆☆ | 50 |
| | | | | | | 3 |
| | | | | | | 53 |

| Filter by... | | | | | |
|---|---|---|---|---|---|
| Music Links ▾ | Song Title | Time | Album | Genre | Rating | Count |
| ☐ All Songs | • Scooter | 3:06 | Music For the Morning | Alternative Country | ✩✩✩ | 1 |
| ☐ Online Store | • Sleep Alone | 6:34 | Great Expectations Soun... | Alternative Country | ✩✩✩✩✩ | 5 |
| ☐ iPod | • Metro Area | 8:23 | Great Expectations Soun... | Alternative Country | ✩✩ | 6 |
|  | • Hollywood | 1:21 | Great Expectations Soun... | Electronic | ✩✩✩✩✩ | 2 |
| ⊕ Recently played | • If I were you | 2:32 | Great Expectations Soun... | Electronic | ✩✩✩✩ | 3 |
| ⊕ ☆ Rating — 1875 | • Mad World | 6:56 | A Bugged out Mix | Electronic | ✩ | 7  1875 |
| ⊖ Pl... | • Silk Road | 3:06 | A Bugged out Mix | Electronic | ✩✩✩ | 10 |
| ⊕ Al... ⊙ Encounter  8:23 • Time for a Dance  ✩✩✩✩✩ | | | | | 8 |
| ⊕ ⊙ Genre  ▲  ▲ | • Forest | 1:21 | Come Away with Me | Pop | ✩✩✩ | 50 |
|  1873 | • Hippies I h... | 2:32 | Come Away with Me | Rock | ✩✩✩✩✩ | 10 |
|  221 | • Spread YW... | 6:56 | Come Away with Me | Rock | ✩✩ | 23 |
|  203 | • Down to Up... | 3:06 | Come Away with Me | Rock | ✩✩✩✩✩ | 50 |
|  205 | • Top | 1:21 | Come Away with Me | Rock | ✩✩✩ | 10 |
|  | • Rough Jump | 1:21 | Come Away with Me | Rock | ✩ | 23 |
|  | • Run Around | 2:32 | Come Away with Me | Rock | ✩✩ | 50 |
|  | • Tweet | 6:56 | Great Expectations Soun... | Soundtrack | ✩✩ | 3 |
| ⊞⊞ View | • Just You | 3:06 | Great Expectations Soun... | Soundtrack | ✩✩✩✩✩ | 53 |

FIG. 19

| | Song Title | Time | Album | Genre | Rating | Count |
|---|---|---|---|---|---|---|
| Filter by... | | | | | | |
| Music Links ▶ | | | | | | |
| □ All Songs | · Scooter | 3:06 | Music For the Morning | Alternative Country | ☆☆☆ | 1 |
| □ Online Store | · Sleep Alone | 6:34 | Great Expectations Soun... | Alternative Country | ☆☆☆☆ | 5 |
| ⊞ □ IPod | · Metro Area | 8:23 | Great Expectations Soun... | Alternative Country | ☆☆ | 6 |
| | · Hollywood | 1:21 | Great Expectations Soun... | Electronic | ☆☆☆☆☆ | 2 |
| ⊘ Recently played | · If I were you | 2:32 | Great Expectations Soun... | Electronic | ☆☆☆☆ | 3 |
| ☆ Rating | · Mad World | 6:56 | A Bugged out Mix | Electronic | ☆ | 23 |
| ⊞ ▦ Playlists | · Silk Road | 3:06 | A Bugged out Mix | Electronic | ☆☆☆ | 7  1871 |
| | · Dust | 6:34 | A Bugged out Mix | Electronic | ☆ | 10 |
| ⊟ ○ Artists — 221 | ⊙ Encounter | 8:23 | Time for a Dance | Pop | ★★★★☆ | 8 |
| □ ○ Madonna | · Forest | 1:21 | Come Away with Me | Pop | ☆☆☆☆ | 50 |
| ☑ ○ 50 Cent | · Hippies I h... | 2:32 | Come Away with Me | Rock | ☆☆☆☆ | 10 |
| □ ○ Chocolate — 649 | · ⊙ Encounter  8:23  Time for a Dance  Pop  ☆☆☆☆☆ 8 | | | | | 23 |
| □ ○ Krudel | · Top | 1:21 | Come Away with Me | Rock | ☆☆☆ | 50 |
| □ ○ Eminem | · Rough Jump | 1:21 | Come Away with Me | Rock | ☆ | 10 |
| ▶ | · Run Around | 2:32 | Great Expectations Soun... | Rock | ☆☆☆ | 23 |
| ⊞ ⊘ Genre | · Tweet | 6:56 | Great Expectations Soun... | Soundtrack | ☆ | 50 |
| ▦ View | · Just You | 3:06 | Great Expectations Soun... | Soundtrack | ☆☆☆☆☆ | 3 |
| | | | | | | 53 |

1093

PROPERTY TREE FOR METADATA NAVIGATION AND ASSIGNMENT

FIELD OF THE INVENTION

The present invention relates generally to data storage in computer systems, and more particularly to methods and apparatus for organizing and locating data items by way of metadata properties.

BACKGROUND OF THE INVENTION

Today most computer users interact with the machine by way of a graphical user interface which, by exploiting the computer's visual display and intuitive input devices such as the mouse, mediates access to the operating system, application programs, and stored data. The standard approach to the design of the user interface has relied on a simple visual metaphor in which data files are contained in folders organized within a hierarchically-structured file system tree. The user interface provides controls that permit the user to navigate through the file system tree in order to locate and act upon data. Although such systems are easier to use than the command-line shell interfaces that preceded them, they generally have not provided a greater degree of abstraction from the underlying physical storage of data than was available in earlier systems.

The real-world familiarity of the file/folder model of storage contributed to its acceptance and popularity among computer users, but such user interfaces were also successful because users typically stored a relatively small number of data files on their machines. The ease with which computer systems can now be used, coupled with the availability of massive amounts of inexpensive disk storage, have to some degree made the standard data storage interface a victim of its own success. Computers are now being used to store large quantities of personal data in a variety of different formats for use with many different applications. It is not uncommon for a user to have hundreds or thousands of text documents, photographs, audio files, and other data records stored across multiple hard disks, shared networks and other storage media. Given such a development, drawbacks to the conventional folder tree storage model have become evident to computer users.

For the present-day user, the conventional storage model is undesirably and inflexibly one-dimensional. Items of data exist in one location and relate to other files in one way, by their relative position within the hierarchical folder tree, which ignores the many logical relationships files may have to one another. In previous versions of Microsoft® Windows®, files are associated with a limited number of properties over which the user has limited control, and those properties are accessible through a control that is difficult to locate and use. In other systems file metadata may be limited to the file name and the user's informal knowledge of the file's type. Such limitations have made it difficult for users to organize their data in new ways based on the content and use of the data. As a result, the growth in the amount of data stored by users has made searching for data less efficient and more cumbersome.

Particular applications have offered domain-specific solutions to the problem of user data management. Two examples involve applications for storing and organizing digital photograph files. The Digital Image Library in Microsoft® Digital Image Suite 9.0 includes a "Keyword Painter" control that enables the user to easily organize and subsequently locate images stored in disparate locations throughout the file system. The user clicks on identifying keywords of the user's own choosing and then clicks on thumbnail images of pictures to which the selected keywords are to be assigned. The user can now filter the view of the library of pictures by particular keywords. Adobe Photoshop Album 2.0 permits the user to associate content-descriptive tags with pictures by drag-drop actions on thumbnail images. The user can then quickly search the collection of pictures by subject matter using one or more tags.

Another example is the Grand Central e-mail interface, a project of Microsoft Research. Hierarchical properties are used to categorize e-mail messages. An arbitrary number of categories can be assigned by way of the user interface. The categories facilitate searching for messages and the organization of messages into conversational threads.

Disclosed features of the Microsoft® Windows® Code-Named "Longhorn" platform point to a more comprehensive solution. A storage subsystem, WinFS, relies on an extensible scheme of metadata properties to enable the user to search for, organize and share data. The basic unit of data container is the item, which is associated with multiple properties set to specific values. Items are organized by properties most relevant to the user at a particular time. Powerful querying capabilities over the store of items are provided. Users can thus find data more quickly and can organize and operate upon data more efficiently.

Prior to the present invention, however, there has been no general mechanism for metadata assignment and metadata-based navigation comparable in ease and generality of use to such conventional storage system interfaces as the file system Explorer tree of previous versions of Microsoft® Windows®, which permit the user to navigate to a folder and to modify its contents in intuitive ways such as by dragging and dropping with the mouse.

SUMMARY OF THE INVENTION

The following represents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

The invention is intended to be practiced in the context of a computer system having a graphical user interface, or another kind of user interface, and a data storage subsystem in which data items are organized and queried by way of metadata properties. In accordance with one embodiment of the invention, a computer-implemented method of assigning values to properties is provided. The method includes displaying a property tree having nodes that expose properties of a set of data items. The method further includes, in response to user input that is indicative of an assignment of a property exposed by the property tree, modifying the value associated with the property in the data storage subsystem.

In another embodiment of the invention, a computer-implemented method of user navigation of data is provided. The method includes displaying a property tree, and, in response to user input indicative of a query of data storage, such as selection of a node that represents the query, displaying a browsable view of data items responsive to the query.

In yet another embodiment of the invention, a display device for user assignment of values to properties and user navigation of data is provided. The display device includes a property tree user interface control for displaying nodes that expose properties of a set of data items. The property tree user interface control is additionally for displaying nodes that represent a query of data storage.

In some aspects of the aforementioned embodiments, the property tree also provides nodes that represent folders within a hierarchical file system, in addition to nodes that represent metadata properties. In other aspects of these embodiments, the property tree has nodes that represent properties with inherent hierarchy, and nodes that represent user-defined hierarchical properties.

The invention may be implemented by way of software, hardware, or a combination thereof. The invention may be implemented, for example, within an operating system shell or within a running application program. It is contemplated that the invention may be embodied in one or more computer-readable media.

Other features of the invention will become apparent from the following detailed description when taken in conjunction with the drawings, in which:

BRIEF DESCRIPTION OF THE DRAWINGS

FIGS. 2, 3, 4, 5, 6, 7, 8, 9, 10, 11, 12, 13, 14, 15, 16, 17, 18 and 19 are screenshots of a user interface for viewing and organizing stored music data, within which an embodiment of the present invention is incorporated.

DETAILED DESCRIPTION OF THE INVENTION

Figure 1:
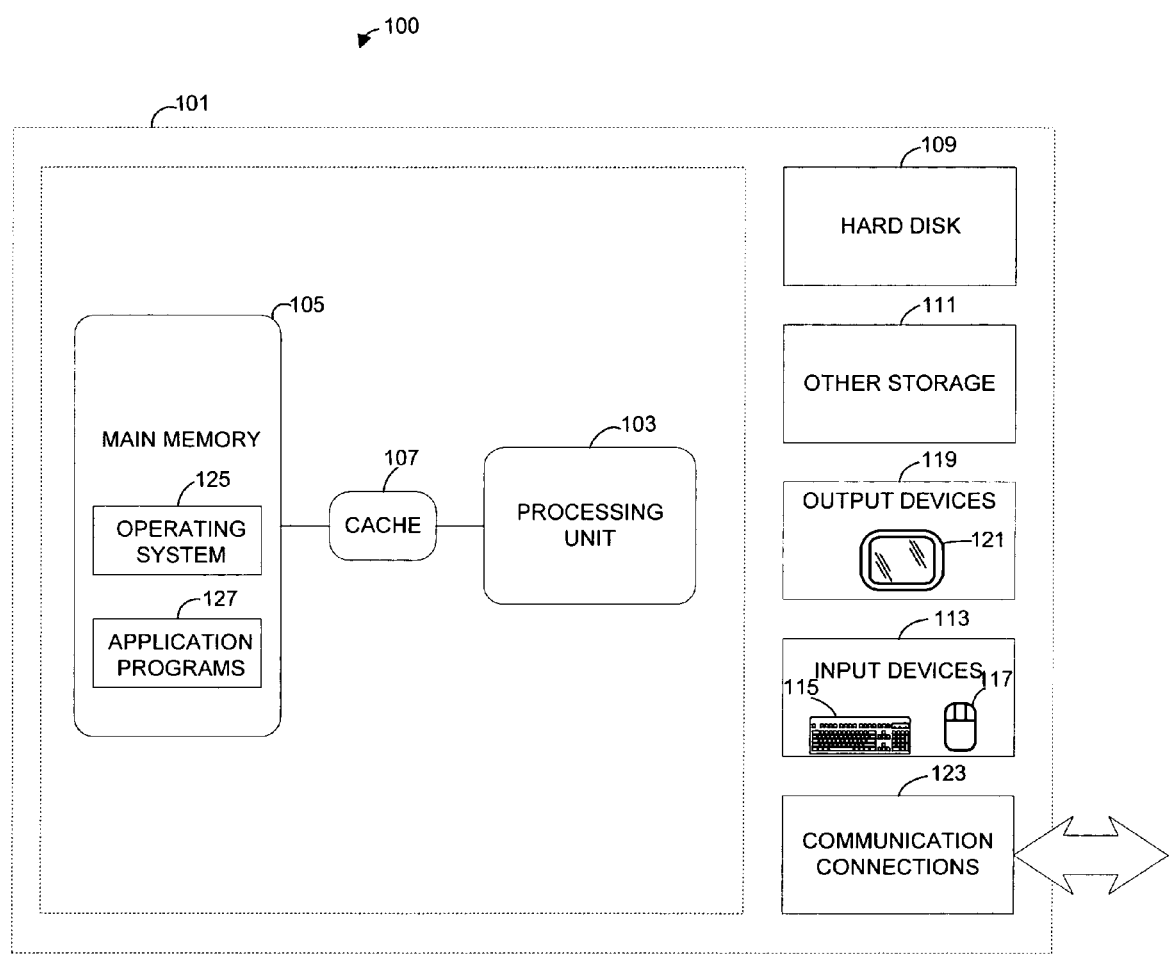
FIG. 1 is a schematic diagram showing an exemplary computer operating environment within which the present invention may be incorporated.

The present invention includes a tree-shaped set of user interface controls that exposes properties of data items, which will henceforth be referred to as the "ProperTree." The ProperTree provides two principal functions. First, the ProperTree enables the user to navigate across the virtual namespace of the user's data. Navigation is discussed further below. Second, the ProperTree permits the user to quickly and easily assign values to data item properties by adding or removing metadata with respect to property nodes exposed by the ProperTree. The user can add metadata to, and remove metadata from, many nodes at the same time. Because the ProperTree mimics the traditional folder tree control in certain respects, it enables users familiar with the conventional approach to storing, organizing and retrieving their data to work comfortably in a system with a radically different approach to storage that relies upon an extensible scheme of metadata properties and querying.

In one embodiment, the ProperTree control is displayed by default in a window within a pane to the left of a pane displaying a list view of items. When the user selects an item, the user can click on a property node exposed by the ProperTree to expand the node in place; the node can be collapsed if it is already expanded. A small widget, such as one displaying '+' or '−', may be used to indicate whether a node is collapsed or expanded. The expansion of a node shows the property values set for the currently selected item, as well as additional values that can be applied. In an embodiment, a most-frequently-used subset of values across a set of items is shown; the user can expand the list of values for the expanded property fully by, for example, clicking on a button. Having expanded a property node in the ProperTree, the user can change the property values; the changes are immediately applied to the item or items that have been selected by the user. The system may assign initial values to properties based on most-frequently used values.

Properties are displayed in the ProperTree in a manner that is appropriate to their type. Certain properties have only one value with respect to an item. A photograph, for example, might be either "Black/White" or "Color," with users being permitted to change this property. The user interface for changing the value may, in such a case, comprise a clickable radio button adjacent to each possible value. Other properties may be capable of having multiple values with respect to an item. For example, a document may have multiple authors. In this case the user interface may comprise a checkbox adjacent to each possible value, with the user being permitted to check one or more boxes as desired. Richer properties are also supported appropriately. For example, a rich calendar control is shown for dates; for ratings, a five-star control may be shown. Properties that cannot be changed by the user, such as the date on which a document is written, do not have value selection controls in the tree, and the nodes for such properties can only be used for navigation. The system is extensible with respect to adding new controls appropriate to particular data types.

For any given property or property value in the ProperTree, the user can navigate to a view of storage that is pivoted to that property or value. Thus, navigation does not simply involve taking the user to a single location, unlike navigation using a conventional folder tree. Rather, navigation by way of the ProperTree causes all relevant data to be rearranged into a new structure through which the user can browse. For example, the user can use the ProperTree to query storage for all documents having a particular "Author" value. The list view then changes to show documents meeting that criterion. Alternatively, the user can use the ProperTree to display all document authors. This causes a stacked view of authors within which the user can then browse.

Turning now to the drawings, FIGS. 2 through 19 are screenshots of an exemplary user interface 201 for viewing and organizing stored music data, incorporated an embodiment of the present invention. On the right is a list view 205, and on the left is a ProperTree property tree 203. In an embodiment, similar interfaces are provided for documents, messages, video files, and contacts, with the ProperTree in each case being specifically adapted for the kind of data item that is presented. Such content-oriented interfaces may be provided with an operating system product as a component of the shell. Additionally, in an embodiment of the invention, the ProperTree is a control made available through the Common File Dialog in Microsoft® Windows® for application developers to reuse in their own applications. As noted above, the ProperTree 203 is displayed on the left side of the window 201 by default.

The ProperTree 203 includes a header 207, which in the depicted case is titled "Music Links". Below the header 207 are the nodes of the ProperTree 203. The nodes labeled Rating 217, Artist 221, and Genre 223, represent single properties. Certain other nodes exposed by the tree 203, All Songs 209, Online Store 211, and Recently Played 215, are constructs that represent a query that searches for particular items in the list view 205 that satisfy conditions of the query. The nodes iPod 213 and Playlists 219, which represent static lists, are similar. If the user selects All Songs 209, for example, all the songs in the list view 205 are displayed. If the user selects Recently Played 215, however, only songs that have recently been played are shown.

Turning to FIG. 3, the effect of an initial user interaction with the ProperTree 203 is shown. "Expand" widgets 327, 329, 331, 333, 335 are displayed next to the expandable property nodes 213, 217, 219, 221, 223, respectively, when the user hovers in the area of the ProperTree with the mouse, as indicated by the arrow cursor 325. The property nodes 213, 217, 219, 221, 223 can be expanded by the user by clicking on the displayed '+' in the widgets 327, 329, 331, 333, 335.

Turning to FIG. 4, there is shown the state of the ProperTree 203 after the user hovers with the mouse over the text label of one of the property nodes, in this case Artists 221, as indicated by the hand-shaped cursor 437. If the user double-clicks on the text label of the property node, the list view 205 will be updated so that it is organized by the particular property that is selected, and the node will expand. In FIG. 5, there is shown the state of the ProperTree 203 when the user hovers with the mouse over the '+' of the expand widget 333 associated with the Artists node 221, as indicated by the mouse arrow cursor 539.

Turning to FIG. 6, there is shown the state of the ProperTree 203 after the Artists node 221 is expanded. The "Artists" text label is rendered in boldface, and the expand widget is replaced by a "collapse" widget 641. A list of five Artists values 643, 645, 647, 649, 651 is displayed, representing the most frequently used and most recently used values, below which is an overflow arrow button 653.

Figure 7:
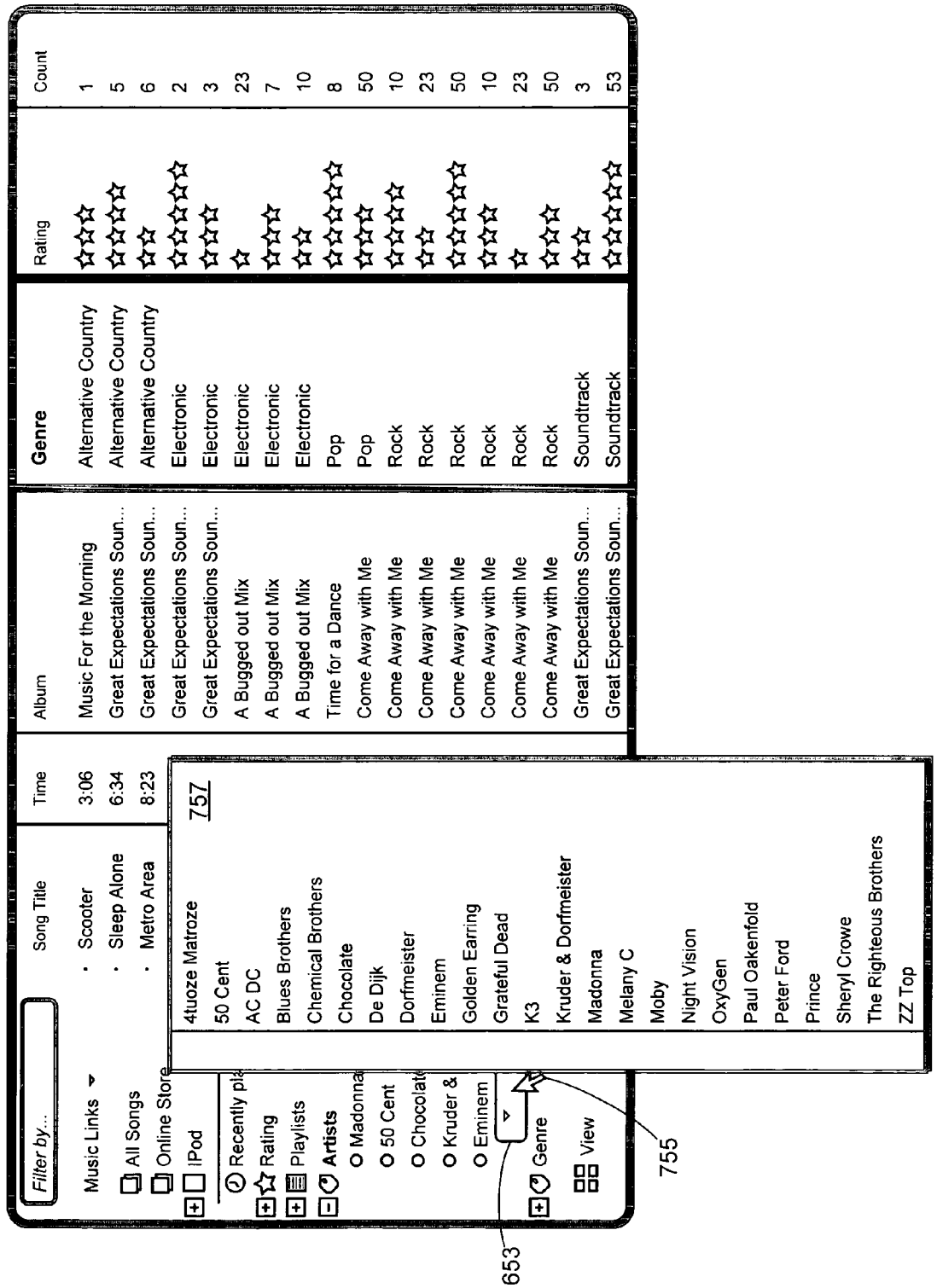

FIG. 7 shows the effect of the user clicking on the overflow arrow 653, as indicated by the mouse arrow cursor 755. A pop-up menu 757 is displayed, showing all the values for the Artists property as a flat list. Alternatively, as shown in FIG. 8, the complete list of values can be displayed in a pop-up menu 859 as a list of several subnodes 861, 863, 865, 867, 869, each subnode representing a range within the full list that can be expanded further by the user by clicking on one of the rightward-pointing arrow buttons 871, 873, 875, 877, 879. An alternative rendering of the range pop-up menu 881 is also shown.

Returning briefly to FIG. 6, it may be noted that a property value name 649 that is too long to display in full is truncated with an ellipsis or similar symbol. In FIG. 9, the effect of hovering over such a truncated value is shown, as indicated by the mouse hand-shaped cursor 983. A pop-up element 985 displays the full name of the value.

Figure 11:
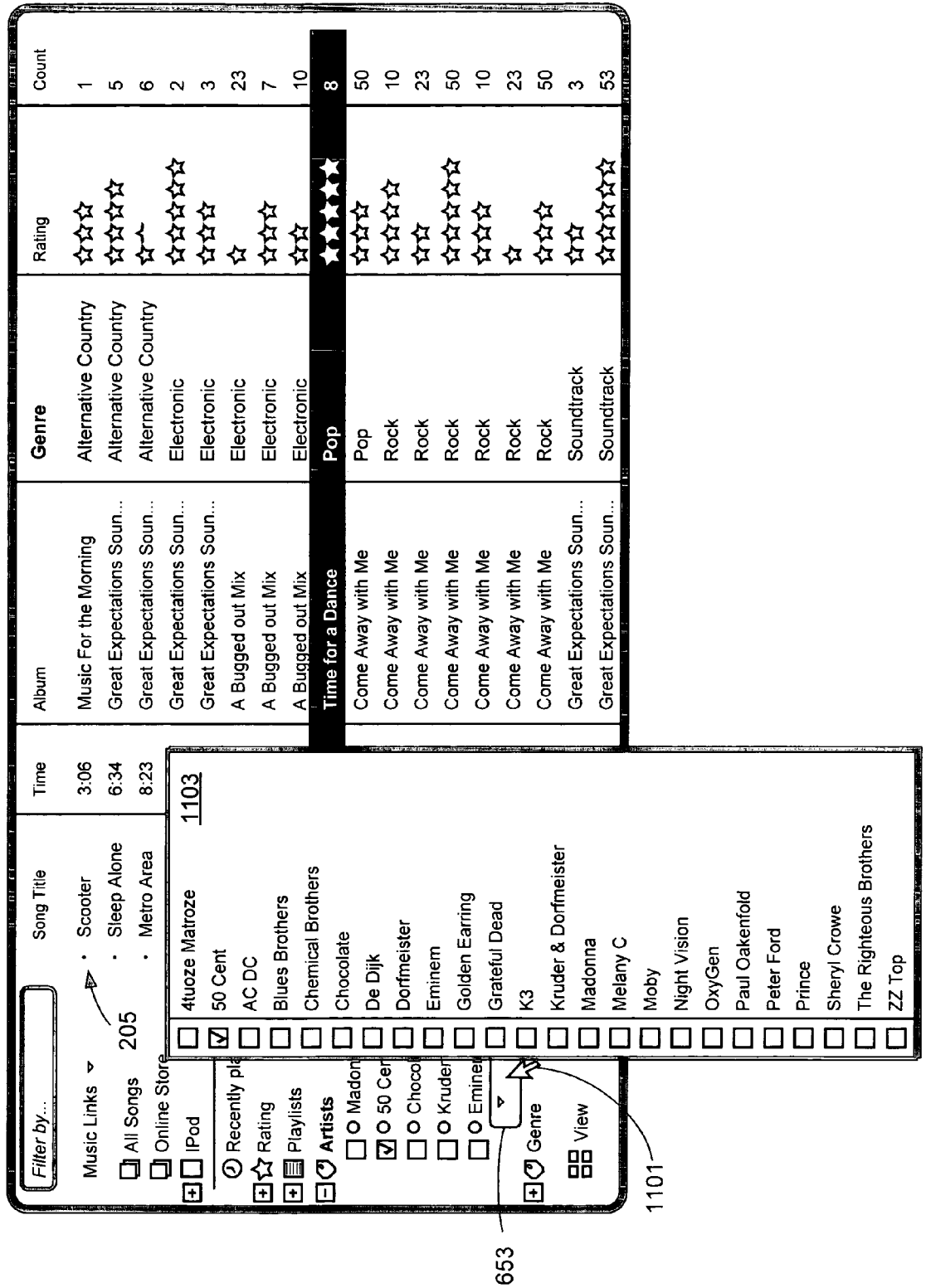

Turning to FIG. 10, there is shown the effect of selecting an item in the list view 205. Checkboxes 1087, 1089, 1091, 1093, 1095 are immediately displayed next to each value in the expanded property node 221. The checkboxes serve as controls by means of which metadata can be assigned to the selected item. In this case, the user has selected the song item "Encounter" 1097. The checkbox 1089 is checked, indicating that the existing Artist value for that item is "50 Cent." The user can check a different box to change the value by assigning a different artist name to the song item. Similarly, checkboxes can be used in a list view of photographs to assign keywords to a selected photograph item. FIG. 11 shows the effect of the user clicking on the overflow arrow button 653 when an item in the list view 205 has been selected, as indicated by the mouse arrow cursor 1101. The pop-up menu 1103 is displayed, each value in the complete list now having a checkbox in front of it.

In general, a property node in the ProperTree 203 may have a context menu that is specific to that node. An example is shown in FIG. 12, where the context menu 1205 for the node Artists 221 is displayed. The top element in the menu 1205 is "Show All Music By Artist" 1207. The effect of selecting this task is identical to the navigation effect of clicking on the "Artists" label, as described above. "Add new Artist" 1209 provides an entry point for the user to add additional values to the list of values for this property node. "Rename" 1211 can be used to rename the property. In this case "Rename" is grayed out because Artists is a property that end users cannot rename. A user can devise new properties which can be made renameable. The "Move Up" 1213 and "Move Down" 1215 menu elements can be used to organize the order of property nodes in the ProperTree 203.

FIG. 13 shows the state of the ProperTree 203 after the user has selected "Add new Artist" 1209 in the context menu 1205 shown in FIG. 12. A type-in box 1317 is displayed, permitting the user to enter a new value for the Artists property. Once a new Artists value is entered, it can be assigned to a selected song item.

FIG. 14 illustrates the fact that the ProperTree 203 is not restricted to containing assignable property nodes, but may contain several kinds of navigable sets, pages or collections. Here the Playlists node 219 has been expanded. Playlists in the music data item context are one example of user-defined lists that function as data item containers, similar to traditional file system folders. As with traditional folders, the Playlists 219 may have an arbitrary number of nested components in a hierarchical structure, unlike property nodes that comprise only values. Here a most-frequently-used subset 1419, 1421, 1423 of the sublists of Playlists is displayed, below which is an overflow arrow button 1425. FIG. 15 displays the state of the ProperTree 203 after the user clicks the overflow button 1425 of FIG. 14. The full list hierarchy of Playlists 219 is displayed, comprising sublists 1421, 1527, 1529, 1531, 1533, 1423.

Turning to FIG. 16, there is shown the state of the ProperTree 203 after the user selects the label 1637 of the "Recently played" node 215, as indicated by the mouse arrow cursor 1635. As noted above, this node is not a single property, but represents a query. The user can pivot the list view by selecting the glyph 1639 to the left of the node label 1637, as explained above. As shown in FIG. 16, selecting the node label 1637 displays a context menu 1641. Selecting the top element 1643 of the context menu 1641, "Show 'Recently Played'", has the same navigation effect as selecting the glyph 1639. Below this are two specific node tasks 1645, 1647 (not further specified here). The remainder of the context menu 1641 is similar to the context menu 1205 for the property node Artists 221 in FIG. 12. The user can select Delete 1649 to delete an item, Rename 1651 to rename it, and Move Up 1653 and Move Down 1655 to reorder it in the ProperTree 203.

Figure 17:
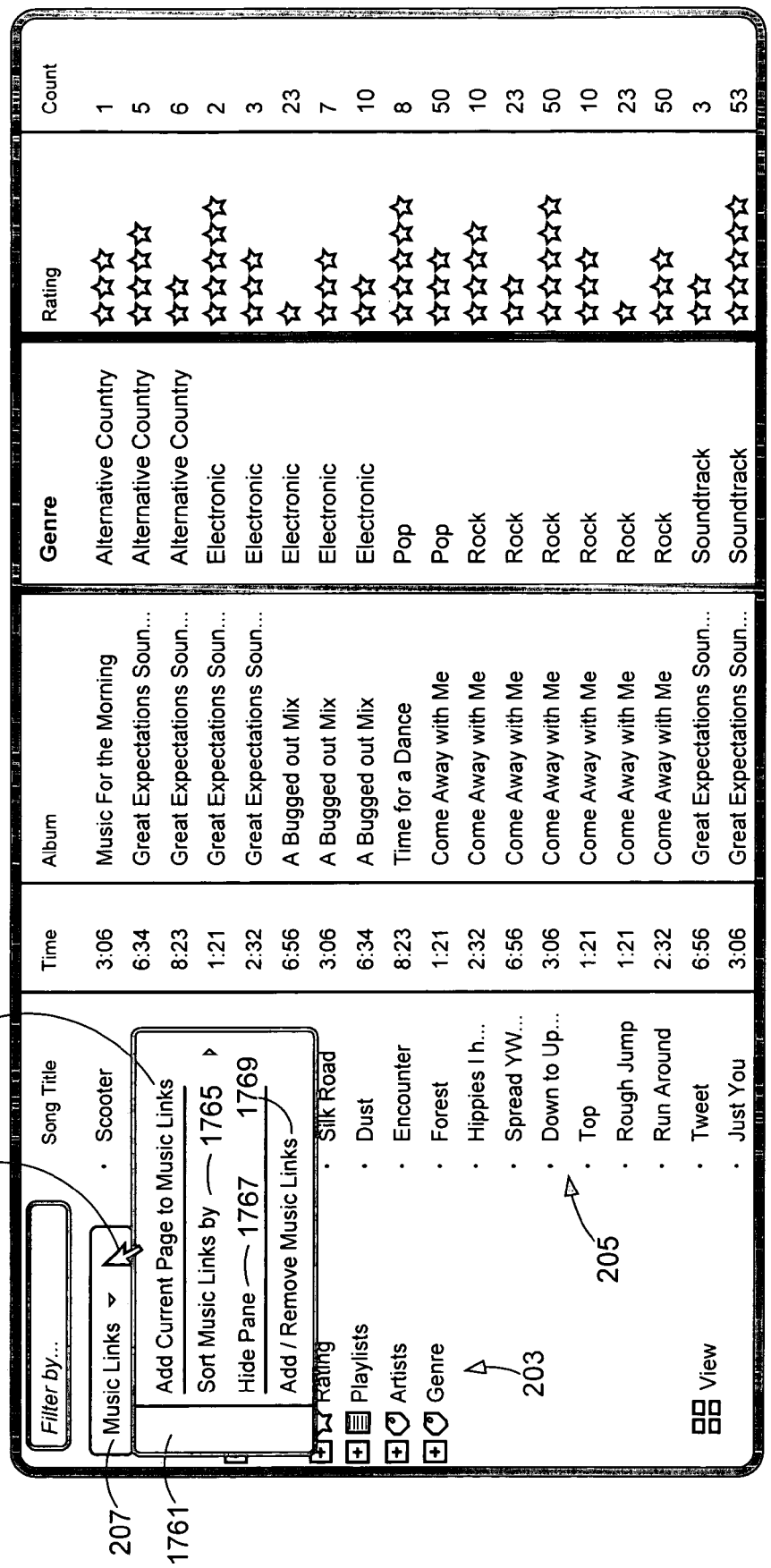

Turning to FIG. 17, there is shown the state of the ProperTree 203 after the user clicks on the Music Links header 207, as indicated by the mouse arrow cursor 1759. A command menu 176 is displayed, permitting the user to perform certain tasks applicable to the entire tree control 203. By selecting the task "Add Current Page to Music Links" 1763, the user can define new nodes to add to the tree 203. By selecting "Sort Music Links by" 1765, the user can sort the nodes in a desired order. The user can hide the entire tree 203 from view by selecting "Hide Pane" 1767. By selecting the entry point 1769 at the bottom of the menu, "Add/Remove MusicLinks", the user causes a dialog to be brought up, allowing the user to select among different properties to add or remove properties to or from the ProperTree 203.

Similarly to the conventional folder tree control, the ProperTree 203 supports drag-and-drop semantics, but the behavior is different. An item in the list view 205 can be dragged and dropped onto a node in the ProperTree 203, but the item does not disappear from the list view; the behavior is more like tagging information to a file. A drag/drop action is shown in FIG. 18. The user clicks on an item in the list view, here the item 1871 corresponding to the song "Encounter," and drags it to the Artists node 221 in the ProperTree 203, as indicated by the mouse arrow cursor 1873 and the blurred selected item image 1875. In this case, Artists 221 is not itself an assignable property. Turning to FIG. 19, if the user hovers over the Artists node 221 for a sufficient length of time, the node 221 expands, permitting the user to drop the dragged item 1871 onto the name of a displayed artist. In this case the user is dropping the item 1871 onto the Artists value "Kruder & Dorfmeister" 649, and the checkbox 1093 associated with that value is highlighted. This is thus another mechanism by which a user can assign metadata to items.

In one embodiment of the invention, the ProperTree is integrated with a conventional folder tree control. In this embodiment, the tree has nodes that represent properties and expand to reveal values, as well as nodes that represent folders located in the hierarchical file system. In this embodiment, the advantages of both the hierarchical model and the metadata model of storage are present. The tree may additionally include nodes representing other constructs, such as a link to a web page.

In an embodiment, the ProperTree supports "hierarchical properties," properties that inherently have hierarchy. For example, a date property may be represented in the tree as the hierarchy:

Year
  Month
    Day

In addition, in an embodiment, the ProperTree supports free-form hierarchical properties that are set by the user. For example:

Animal
  Dog
    Poodle
  Cat
Mineral
  Gold
Plant
  Palm Tree

FIG. 1 is a highly simplified schematic diagram showing an example of a suitable operating environment 100 in which the invention may be implemented. The features of such environments are well-known to those having skill in the art and need not be described at length here. The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an exemplary system for implementing the invention includes a computing device, such as device 101. Device 101 typically includes at least one processing unit 103 and main memory unit 105, and at least one level of cache memory 107 connected to or situated within the processing unit 103 and serving as a buffer for the main memory 105. Device 101 has additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonvolatile computer-readable media capable of nonvolatile storage of program modules and data and accessible by device 101. Any such storage media may be part of device 101. To facilitate user-machine interaction, device 101 has input devices 113, such as a keyboard 115 and a mouse 117 or other pointing device, and output devices 119, including a monitor or other display device 121. Device 101 also typically includes one or more communication connections 123 that allow the device to communicate data with other devices.

Programs, comprising sets of instructions and associated data for the device 101, are stored in the memory 105, from which they can be retrieved and executed by the processing unit 103. Among the programs and program modules stored in the memory 105 are those that comprise or are associated with an operating system 125 as well as application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109.

Computing device 101 includes forms of computer-readable media. Computer-readable media include any available media that can be accessed by the computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

All references cited herein are hereby incorporated by reference to the same extent as if each reference were individually and specifically indicated to be incorporated by reference and were set forth in its entirety herein.

The use of the terms "a," "an" and "the" and similar referents in the context of describing the invention, especially in the context of the following claims, is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In a computer system having a graphical user interface and a data storage subsystem, a computer-implemented method of assigning values to properties, comprising:
    first displaying a property tree, the property tree having a plurality of property nodes that can be expanded to reveal sub-nodes, each of the sub-nodes representing metadata properties of a set of data items, wherein the metadata properties are of a type consistent with the expanded one of the property nodes;
    receiving an indication of a selection of one or more data items of the set of data items residing in the data storage subsystem, wherein the set of data items are organized and queried by way of the metadata properties;
    receiving a user input indicating one of the revealed sub-nodes thereby defining a new value for the selected one or more data items;
    in response to the user input, modifying the metadata properties of the selected one or more data items associated with the indicated one of the sub-nodes to be the new value as stored in the data storage subsystem; and
    second displaying the property tree such that the new value is associated with the indicated one of the sub-nodes, wherein displaying the property tree comprises displaying one of the sub-nodes with an adjacent button for indicating a new value.

2. The method of claim 1, wherein the user input is indicative of adding metadata to at least one property node in the property tree.

3. The method of claim 1, wherein the user input is indicative of removing metadata from the at least one property node in the property tree.

4. The method of claim 1, wherein first displaying the property tree comprises displaying the property tree in a pane in a window, the window having a second pane displaying a list view of data items within the set of data items.

5. The method of claim 1, wherein the user input includes expanding the at least one property node to reveal the sub-nodes.

6. The method of claim 1, wherein displaying the property tree further comprises displaying a most frequently used subset of sub-nodes associated with one of the plurality of property nodes.

7. The method of claim 6, wherein the user input indicates an expansion the one of the plurality of property nodes, and wherein second displaying the property tree further comprises, displaying a full set of the sub-nodes of a type associated with the expanded one of the plurality of property nodes.

8. The method of claim 1, wherein displaying the property tree further comprises displaying the adjacent button as a radio button for indicating a new value.

9. The method of claim 8, wherein the user input includes clicking the radio button.

10. The method of claim 1, wherein displaying the property tree further comprises displaying a sub-node associated with a multiple-valued property node of the plurality of property nodes with an adjacent checkbox.

11. The method of claim 10, wherein the user input includes checking the checkbox.

12. The method of claim 1, wherein first displaying the property tree further comprises displaying a sub-node associated with a property node of the plurality of property nodes by way of a user-defined control.

13. The method of claim 1, wherein the user input includes dragging and dropping the selected one or more data items of the set of data items onto a sub-node in the property tree.

14. The method of claim 1, wherein first displaying the property tree further comprises displaying a tree that has nodes that represent folders within a hierarchical file system.

15. The method of claim 14, wherein first displaying the property tree further comprises displaying a tree that has a property node of the plurality of property nodes that represents a link to a web page.

16. The method of claim 1, wherein first displaying the property tree further comprises displaying a tree that has a property node of the plurality of property nodes that represents a type of property that has inherent hierarchy.

17. The method of claim 1, wherein first displaying the property tree further comprises displaying a tree that has a property node of the plurality of property nodes that represents a user-defined hierarchical property.

18. The method of claim 1, wherein the set of data items residing in the data storage subsystem includes data items that comprise one or more of text data, audio data, video data, and image data.

19. The method of claim 1, wherein the method is performed within an operating system shell.

20. The method of claim 1, wherein the method is performed within a running application program.

21. In a computer system having a graphical user interface and a data storage subsystem in which data items are organized and queried by way of metadata properties, a computer-implemented method of user navigation of data, comprising:
    displaying a property tree, the property tree having a plurality of nodes exposing properties of the data items, wherein displaying the property tree comprises displaying one of the plurality of nodes with an adjacent button for exposing the properties of the data items;
    simultaneously displaying a list view, wherein the list view is a set of the data items organized by a particular property;
    receiving a user input that queries the data storage subsystem with a criterion;
    in response to the user input, displaying in the list view the set of data items organized by the particular property meeting the criterion;
    receiving an indication of a selection of one or more data items of the set of data items displayed in the list view;
    receiving a second user input indicating one of the plurality of nodes; and
    applying the exposed properties associated with the indicated one of the plurality of nodes to the particular property of the selected one or more data items such the organization of the set of data items in response to the criterion is modified.

22. The method of claim 21, wherein the user input includes selection of a node in the property tree that represents the query.

23. The method of claim 21, wherein displaying the property tree includes displaying at least one node that represents a navigable set containing data.

24. The method of claim 23, wherein the at least one node that represents a navigable set has at least one nested component.

25. The method of claim 21, wherein the user input includes expanding at least one node in the property tree.

26. The method of claim 21, wherein the data items include items that comprise one or more of text data, audio data, video data, and image data.

27. The method of claim 21, wherein the method is performed within an operating system shell.

28. The method of claim 21, wherein the method is performed within a running application program.

29. A computer-readable storage medium having computer-executable instructions for performing a method for user assignment of values to metadata properties of stored data items, the method comprising:

first displaying a property tree, the property tree having a plurality of property nodes that can be expanded to reveal sub-nodes, each of the sub-nodes representing metadata properties of a set of data items, wherein the metadata properties are of a type consistent with the expanded one of the property nodes;

receiving an indication of a selection of one or more data items of the set of data items residing in the data storage subsystem, wherein the set of data items are organized and queried by way of the metadata properties;

receiving a user input indicating one of the revealed sub-nodes thereby defining a new value for the selected one of more data items;

in response to the user input, modifying the metadata properties of the selected one or more data items associated with the indicated one of the sub-nodes to be the new value as stored in the data storage subsystem; and second displaying the property tree such that the new value is associated with the indicated one of the sub-nodes, wherein displaying the property tree comprises displaying one of the sub-nodes with an adjacent button for indicating a new value.

30. A computer-readable storage medium having computer-executable instructions for performing a method for user navigation of data in a data storage subsystem in which data items are organized and queried by way of metadata properties, the method comprising:

displaying a property tree, the property tree having a plurality of nodes exposing properties of the data items, wherein displaying the property tree comprises displaying one of the plurality of nodes with an adjacent button for exposing the properties of the data items;

simultaneously displaying a list view, wherein the list view is a set of data items organized by a particular property;

receiving a user input that queries the data storage subsystem with a criterion;

in response to the user input, displaying in the list view the set of data items organized by the particular property meeting the criterion;

receiving an indication of a selection of one or more data items of the set of data items displayed in the list view;

receiving a second user input indicating one of the plurality of nodes; and applying the exposed properties associated with the indicated one of the plurality of nodes to the particular property of the selected one or more data items such the organization of the set of data items in response to the criterion is modified.

* * * * *